Jan. 20, 1970             R. J. RAINAR             3,491,186
METHOD OF ROLL-CURING RUBBER SHEETS USING DIRECT CURRENT
Filed Oct. 26, 1967
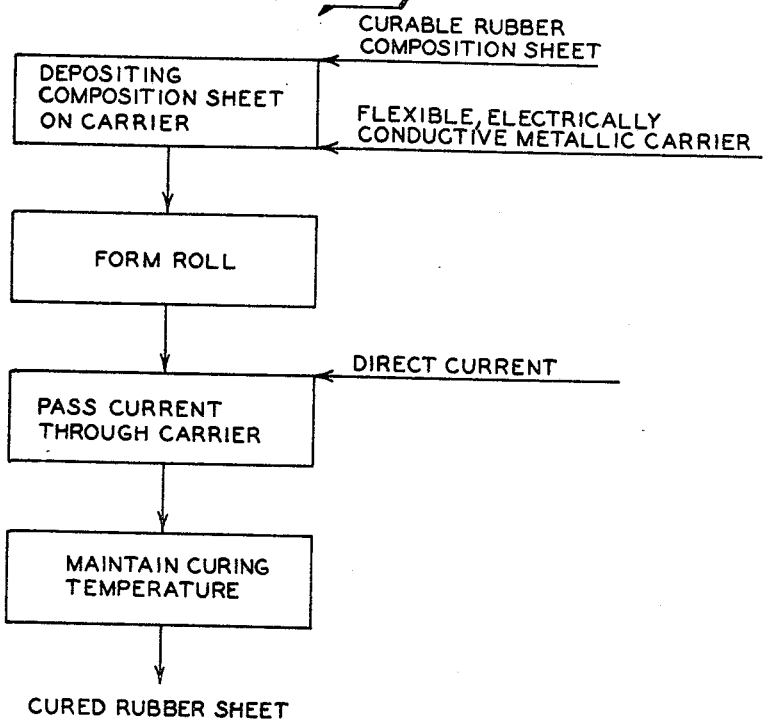
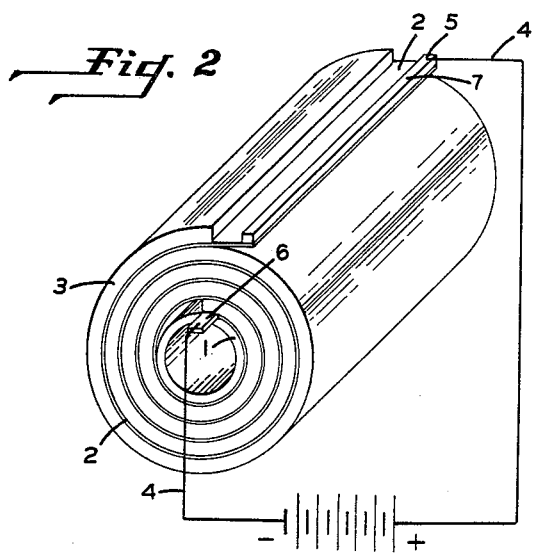
INVENTOR
ROBERT J. RAINAR
BY *Theodore L. Thomas*
ATTORNEY

United States Patent Office 3,491,186
Patented Jan. 20, 1970

3,491,186
METHOD OF ROLL-CURING RUBBER SHEETS USING DIRECT CURRENT
Robert J. Rainar, Lancaster, Pa., assignor to Armstrong Cork Company, Lancaster, Pa., a corporation of Pennsylvania
Filed Oct. 26, 1967, Ser. No. 678,419
Int. Cl. B29h 5/01; B29d 7/22
U.S. Cl. 264—295
5 Claims

ABSTRACT OF THE DISCLOSURE

A method of curing rubber sheets by depositing a flexible sheet of curable rubber composition on a flexible, electrically conductive metallic carrier therefor, and forming a roll of the conductive carrier having the rubber sheet thereon. The steel sheet has a thickness in the range of 0.012″–0.025″, an electrical resistivity in the range $10$–$100 \times 10^{-6}$ ohm-cm., and the roll has a pressure in the range 1–30 pounds per linear inch. Direct current is passed through the steel sheet to cause heating by the electrical resistance of the sheet, sufficient power being used to supply the heat necessary to cure the rubber sheet.

BACKGROUND OF THE INVENTION

Field of the invention

The invention relates generally to the curing of rubber by electrical means. The rubber to be cured will be blended and formed in any conventional manner. The rubber composition will contain curing systems such as sulphur-containing curing systems or peroxide curing systems. The curable rubber composition will be sheeted out in order that it may be placed on top of the steel carrier in order to form the tight roll or coil.

Description of the prior art

U.S. Patent No. 1,237,554—Price teaches a method of curing a rubber sheet by coiling together the sheet to be cured and a thin sheet of flexible metal. Electrical current is then passed through the metal sheet to heat and thus cure the rubber. This process, though available since 1917, apparently has never been used commercially for good reasons. The curing of the rubber sheet in a coil calls for maintaining many narrowly defined conditions as to the electrical and strength characteristics of the sheet. Perhaps most important of all, the process appears to be totally inoperable when using alternating current, as contemplated by the Price patent. Only direct current allows sufficient control of heating conditions in such a system to accomplish a usable rubber cure. The coiled metallic sheet develops inductive impedance when alternating current is used, producing overheating at the edges of the coil as opposed to the center of the coil. Only the use of direct current enables one to control the heating in the interior of the coil with sufficient homogeneity to produce acceptable cure in the rubber sheet.

SUMMARY OF THE INVENTION

The invention relates to a method of depositing a flexible sheet of curable rubber composition on an electrically conductive steel carrier for the sheet, forming a roll from the carrier while the sheet is on the carrier, and passing direct electrical current through the carrier to heat the sheet to a temperature sufficiently high to initiate curing of the rubber. The carrier will be a steel sheet having a thickness in the range of 0.012″–0.025″, an electrical resistivity in the range $10$–$100 \times 10^{-6}$ ohm-cm. (volume resistivity). The pressure on the rubber sheet should be controlled as the roll or coil is formed to produce a pressure in the range of 1–30 pounds per linear inch. The voltage and amperage of the direct current should be such to produce a watt density of 5–60 watts per square foot.

BRIEF DESCRIPTION OF THE DRAWING

FIG. 1 is a flow diagram of the process of the present invention, and
FIG. 2 illustrates a roll in simplified form ready for heating.

DESCRIPTION OF THE PREFERRED EMBODIMENTS

The rubber compositions to be cured by the method of the present invention are any of the known and existing rubber compositions which are customarily made in sheet form. Such cured rubber sheets are widely used as cushioning material, as gaskets and packings when the proper shapes are cut therefrom, as flooring material, including runners and stair coverings, and as tiles cut from the sheet.

The rubber to be cured may be any of the natural or synthetic rubbers such as the SBR, NBR, CR, these being butadiene-styrene copolymers, butadiene-acrylonitrile copolymers, and chloroprene rubber (neoprene), respectively. It will be apparent that any curable elastomer may be utilized in the process of the present invention including chlorosulfonated polyethylene, the isoprene rubbers, rubbers formed from butadiene itself and butadiene homologues, silicone rubbers, the sulphur-containing rubbers, and any of the curable specialty rubbers. It is essential merely that the elastomer be compounded in the presence of curing agents, and that the mixture be curable on the application of heat.

The curing agent to be present in the rubber composition will be any of the conventional curing agents used to cure elastomers. These may be the peroxides, the sulphur-containing systems, or any of the metallic cross linking agents. Rubber accelerators and ultra-accelerators will be used where desired just as in normal and conventional curing processes. The neoprene rubbers cure particularly well with zinc oxide. Other metallic oxides may be used with any of the rubbers where useful. In addition to any of the curing systems, accelerators, or ultra-accelerators, there may be used any of the conventional fillers. Reinforcing carbon blacks, semi-reinforcing carbon blacks, and other carbon blacks may all be present. There may also be used various inert fillers, both granular and fibrous. Lubricants, pigments, plasticizers, and dies may be present. Additional diluent resins or reinforcing resins such as the hydrocarbons (terpenes and coumarone-indenes) may be used where their presence is desirable.

Various mixtures of the above rubbers, resins, fillers, plasticizers, curing systems, and the like may be utilized. The composition will be mixed or compounded by conventional means on mills, in intensive mixers, or any other convenient manner. When the mixing is complete, the curable rubber composition will be formed into an elongated sheet, for example on a calender. The sheet may be of extensive length, 500 feet being usable in the process of the present invention. Shorter sheets are also usable, although when the lengths of the sheets are less than about two feet, one of the prior processes of curing the sheet such as press curing may be as practical as the present process.

The carrier will be a steel belt or sheet which may be cold rolled and which is sufficiently flexible to be formed into a roll. The metal of the carrier sheet must conduct electrical current. The heat is supplied in the curing process of the present invention by the resistance of the metal carrier to the passage of electrical current. The sheet must be inert to the rubber composition, strong, resistant to deformation, and must have more electrical resistance than copper. It is for this reason that a steel sheet is required, and the steel sheet will preferably be polished. The steel belt or sheet will have a thickness in the range of 0.012″–0.025″ and will have an electrical volume resistivity in the range $10–100 \times 10^{-6}$ ohm-cm. Stainless steels such as those designated 304, 310 and 316 are inert to the action of air at elevated temperatures and resist the various ingredients, particularly the acidic ingredients, often found in curable rubber compositions. Flexible stainless steel sheets as described above, although they are expensive, are commercially available in widths up to 36″, with greater widths in prospect.

The flexible, curable rubber composition sheet is merely deposited or laid on the steel carrier. As the rubber composition sheet is run off a calender, the carrier may pick it up and transport it to the site where the system is to be rolled. The length of the carrier will be approximately that of the length of the desired cured sheet, and the width will preferably be equal to or slightly greater than the width of the rubber composition sheet. The system that is to be rolled into a tight roll or coil can be thought of as a carrier sheet having a rubber sheet of the same width and length resting thereon. The rubber sheet will generally have a thickness in the range of $\frac{1}{32}″–\frac{1}{4}″$.

The rolling of the system is preferably done on a mandrel which serves as a core. As the mandrel winds up the carrier having the rubber composition sheet thereon, the carrier sheet must be pulled tight in order that the roll will be formed under pressure. To produce usable products from the uncured rubber compositions, it is necessary to cure the rubber compositions under pressure. The requisite pressure may be obtained in the present process simply by winding the roll as tightly as desired to produce the requisite pressure throughout the roll or coil. Instead of merely tightly winding the carrier and uncured rubber sheet on the mandrel, backup rolls may be used to press against the mandrel as it accumulates additional layers of carrier and sheet. The pressure needed throughout the roll will be in the range of 1–30 pounds per linear inch, with 15 pounds per linear inch being a generally useful and preferred pressure. This pressure per linear inch means that the stated pressure will be used per inch of width of the rubber sheet to be cured. For a sheet 50″ wide to be subjected to the preferred pressure of 15 pounds per linear inch, a total tension of 750 pounds will be applied to the steel carrier sheet during wind-up. The stated minimum pressure of one pound per linear inch will produce a unit pressure of about 15–20 pounds per square inch on the rubber sheet.

When the roll has been completely wound, electrical current must be passed through the carrier in order to supply heat to the curable rubber sheet. It is preferred that the electrical contact terminals be connected on the ends of the carrier as opposed to the edges thereof. The ends of the carrier may have tabs mounted thereon to aid in making the electrical connection and to serve as terminals, and the terminals may have additional thicknesses of a conductive metal soldered or welded thereon. Alternatively, simple electrical connections may be made on the carrier itself by means of suitable clamps. In view of the conductivity of the metallic carrier, low voltages and high currents will be used. The curing temperature range for these rubber compositions is generally in the range of 200°–400° F. The watt density to be utilized in the present process to produce these temperatures must be in the range of 5–60 watts per square foot, depending on the exact cure temperature to be used. A watt density of 40 watts per square foot is a good working power level and will require about 60 minutes of time to heat a roll to a temperature of 300° F. If time is unimportant, a lower watt density may be used. A working range is to use a watt density of 10–40 watts per square foot to take the temperature up to about 300° F., and then either progressively reduce the power input, or cut it off, to complete the curing cycle. When the desired temperature is reached using any watt density within the limits above stated, the power can then be reduced substantially; the rubber composition holds heat well. The power for heating is best thought of in terms of unit areas rather than total power since the length and width of the carrier will determine the heating per unit area for a given power output. The voltages used to produce the required watt density will be in the general range of 12–100 volts, while the current used with these voltages will be in the range of 55–2300 amperes. Higher voltages will be required with lower amperages. Thermocouples may be positioned as desired in the rubber composition to follow the temperature history of the rubber composition, until such time as the operator learns enough about the particular rubber composition being cured to dispense with the need for actually measuring internal temperatures.

The voltages and amperages mentioned above are all of direct current, and any convenient source of direct current will suffice. It is not possible to produce uniform heating throughout the roll or coil using alternating current in view of the inductive effects produced by the pulsing of alternating current through the coiled roll of steel. Alternating current produces such appreciable effects that external heating or cooling will not suffice to preserve uniform heating throughout the roll or coil. When using direct current, it may be found that the outer edges of the roll or coil are cooler than the interior of the roll. It is relatively easy to compensate for this edge cooling by placing the entire roll in an oven or by otherwise subjecting the edges of the roll to additional heat with radiators or hot air to minimize heat loss in those regions. A more refined way to supply additional heat to the edges is to superimpose a slight alternating current ripple in the direct current flowing through the system. This slight additional alternating current may be controlled to supply additional heat to the edges of the roll or coil, the additional heat being just sufficient to compensate for heat losses in those regions.

If the core or mandrel on which the roll is wound is thermally or electrically conductive, insulation must be used to minimize or prevent electrical or thermal losses. It has been found desirable to place thermal insulation around the roll itself to minimize heat losses, in addition to minimizing the particular heat loss suffered at the edges as described above.

Power will be cut off when the cure of the rubber sheet has advanced to the desired extent. Cooling is readily accomplished by unwinding the roll and, if desired, spraying the system with water. The cured rubber sheet will be found to have a polished surface when the surface of the steel carrier is polished. In fact, the rubber sheet will reflect the surface characteristics of the carrier in the same manner as a sheet cured in the mold reflects the characteristics of the mold surfaces.

The process illustrated in the simplified flow diagram of FIG. 1 is self-explanatory. Referring to FIG. 2, the mandrel or core 1 has wound thereon a metallic carrier 2 which serves to confine the flexible rubber composition sheet 3 within the confines of alternate layers of the roll. A source of direct current passes electricity through the leads 4 to the terminlas 5 and 6 of the carrier 2 reinforced at 7.

I claim:

1. In the method of curing rubber sheets by depositing an elongated flexible sheet of curable rubber composition on a flexible, electrically conductive metallic carrier therefor, forming a roll from said carrier while said sheet is positioned thereon, passing electrical current through said carrier to heat said sheet to a temperature sufficiently high to initiate curing of said rubber, and maintaining the temperature for a sufficiently long period of time to cure said rubber, the improvement which comprises depositing said rubber composition on a steel sheet having a thickness in the range of 0.012″–0.025″ and an electrical resistivity in the range $10–100 \times 10^{-6}$ ohm-cm., forming said roll at a pressure in the range of 1–30 pounds per linear inch, and passing sufficient direct current through said carrier to cause a watt density in said carrier in the range of 5–60 watts per square foot.

2. The method according to claim 1 wherein said pressure is about 10 pounds per linear inch.

3. The method according to claim 1 wherein said curable rubber composition is calendered onto said carrier.

4. The method according to claim 1 wherein said electrical current produces a watt density in the range of about 10–40 watts per square foot.

5. The method according to claim 1 wherein said direct current contains an alternating current therein sufficient to supply additional heat to the edges of said roll.

References Cited

UNITED STATES PATENTS 1,237,554   8/1917   Price _____ 264—320

DONALD J. ARNOLD, Primary Examiner

A. H. KOECKERT, Assistant Examiner

U.S. Cl. X.R.

264—316, 320